Dec. 27, 1927.

M. J. CAIN 1,653,758

FUEL VAPORIZER

Filed March 12, 1927

Inventor
Marcus J. Cain,
By Buedwin & Wight
Attorneys

Patented Dec. 27, 1927.

1,653,758

UNITED STATES PATENT OFFICE.

MARCUS J. CAIN, OF CHADRON, NEBRASKA.

FUEL VAPORIZER.

Application filed March 12, 1927. Serial No. 174,888.

This invention relates to a device to be used particularly in connection with the usual internal combustion engine of an automobile for the purpose of vaporizing, atomizing and more thoroughly mixing the fuel and air leaving the carburetor before it enters the engine. The fuel is also slightly preheated prior to its introduction into the carburetor and the mixture of fuel and air leaving the carburetor is further preheated before passing into the intake manifold.

In the specific embodiment of the device illustrated, the invention comprises a cylindrical member interposed between the carburetor and the intake manifold comprising a large number of relatively small tubes through which the mixed fuel must pass on its way to the intake manifold. This cylindrical member is also interposed in the exhaust pipe so that the exhaust gases surround all of the small pipes above mentioned and the mixture is thereby highly heated. In order to preheat the fuel before its inlet into the carburetor, a coil in the fuel line is disposed at one end of the cylindrical member and the preheated mixture of air and fuel which leaves the device comes in contact with said coil thereby preheating the fuel.

Figure 1:
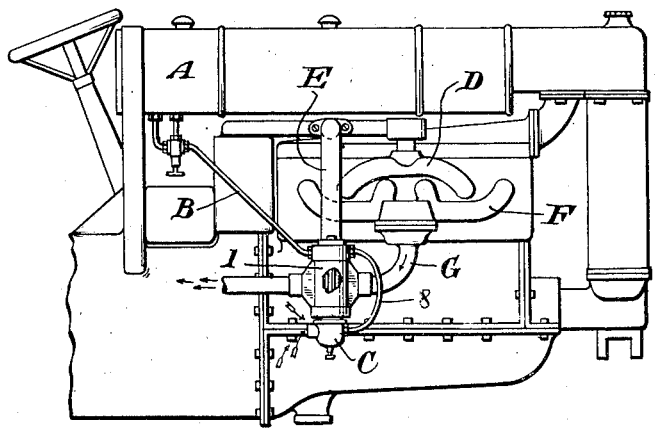
Figure 1 is a side elevation of a conventional automobile engine showing the relative location of the device constituting the invention.
Figure 2:
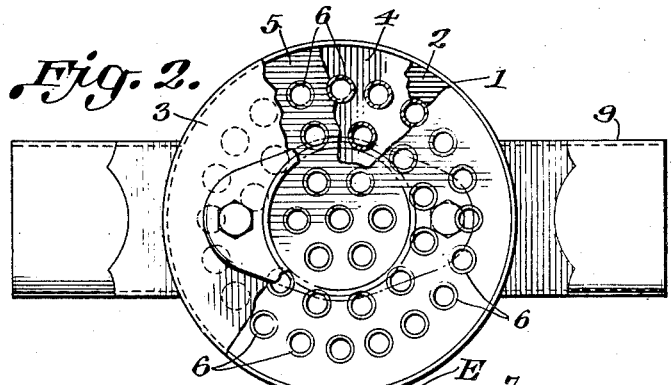
Figure 2 is a top plan view of the device with parts omitted and parts broken away.
Figure 3:
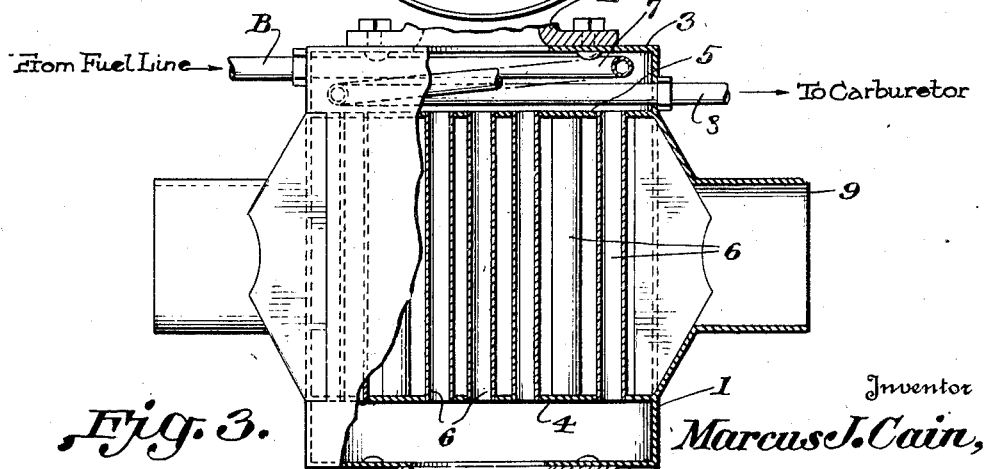
Figure 3 is a vertical section through the device.

The drawings illustrate in a conventional automobile engine a fuel supply A, fuel pipe line B, carburetor C, intake manifold D, a line E leading from the carburetor to the intake manifold, exhaust manifold F and exhaust pipe G. These parts may all be of any old or desired construction and their precise form may vary widely.

A device constituting the subject matter of the invention comprises a generally cylindrical member 1, having a bottom plate 2, a top plate 3, an intermediate bottom partition 4 spaced from the bottom plate and a top partition 5 spaced from the top plate. This construction forms a chamber in the lower part of the device and a similar chamber in the upper part. The lower or bottom plate 2 is attached to the carburetor C or its outlet pipe and the upper or top plate 3 is similarly connected to the pipe E which leads to the intake manifold D.

A large number of relatively small pipes 6 extend between the plates 4 and 5 and therefore afford communication between the lower and the upper chambers just mentioned. The pipe line B leading from the fuel supply communicates with a coil 7 located in the upper chamber and the outlet from this coil is connected by a pipe 8 to the carburetor C. On each side of the cylindrical member 1 are pipe extensions 9, either of which may be attached to the exhaust pipe G.

It is obvious that the space between the plates 4 and 5 surrounding the tubes 6 is in free communication with the exhaust pipe and hence all of the exhaust gases will pass through this space and come into direct contact with the walls of the pipes 6. The fuel which passes into the coil 7 will be heated somewhat by the heated mixture of fuel and air which passes through the pipes 6 on its way to the intake manifold. After being thus heated, the fuel passes through the pipe 8 to the usual carburetor connection. Leaving the carburetor the mixed fuel and air passes into the lower chamber of the device and thereupon it passes up through the large number of small tubes 6 into the upper chamber and is highly heated by the exhaust gases during this passage. From the upper chamber the vaporized and thoroughly mixed fuel is drawn into the intake manifold by the suction of the engine in the usual manner.

It will be observed that the invention comprises a very simple unit which can readily be interposed between the carburetor and intake manifold and also in the exhaust pipe line. It serves the dual purpose of heating the fuel before it reaches the carburetor, thus facilitating the atomization thereof and its thorough mixing with the air and at the same time the fuel mixture leaving the carburetor is highly heated by the exhaust gases. Actual and continued tests have shown that there is a resultant saving in fuel consumption of from 15 to 20% which is brought about by the use of this device. It is obvious that minor detail changes in the precise form and construction can be made, particularly such as may be necessary to adapt the invention to different forms of engines or different arrangement of the elements thereof without in any way departing from the spirit of the invention, which is to be regarded as limited by the scope of the appended claims.

I claim as my invention:

1. A fuel vaporizing device adapted for use in connection with internal combustion engines and comprising a casing adapted to be interposed between the carburetor and intake manifold and in the exhaust pipe line, said casing being divided into three compartments the upper and lower of which are connected by a plurality of relatively small pipes which receive the mixed fuel and air from the carburetor through the lower chamber and discharge the same through the upper chamber into the intake manifold, and a coil of pipe in the upper chamber which coil is connected at one end to the fuel supply pipe and at its other end to the carburetor, the intermediate chamber being connected to the exhaust manifold whereby the exhaust gases surround said plurality of small pipes.

2. A fuel vaporizing device adapted for use in connection with internal combustion engines and comprising a casing divided into three compartments the lower of which is connected to the carburetor, the upper of which is connected to the intake manifold, and the middle of which is connected to the exhaust manifold, a plurality of small pipes connecting the upper and lower chambers and affording passage for the mixed fuel and air discharged from the carburetor, and a coil of pipe in the upper chamber which coil is connected to the fuel supply line and the carburetor at its respective ends.

In testimony whereof, I have hereunto subscribed my name.

MARCUS J. CAIN.